United States Patent [19]

Jeter et al.

[11] Patent Number: 5,652,915
[45] Date of Patent: Jul. 29, 1997

[54] SYSTEM FOR CONTROLLING MODE OF OPERATION OF A DATA CACHE BASED ON STORING THE DMA STATE OF BLOCKS BY SETTING THE DMA STATE TO STALL

[75] Inventors: Jay D. Jeter; Ronald J. Landry, both of Allen; Patrick S. Milligan, Plano; Gerry R. Dubois, Lucas, all of Tex.

[73] Assignee: Northern Telecom Limited, Montreal, Canada

[21] Appl. No.: 391,524

[22] Filed: Feb. 21, 1995

[51] Int. Cl.⁶ .................................................. G06F 13/00
[52] U.S. Cl. ................... 395/872; 395/450; 395/469; 364/243.41; 364/238.4; 364/242.3; 364/259.2
[58] Field of Search ........................ 395/469, 445, 395/470, 471, 872; 364/238.4, 242.3, 243.41, 246.8, 254.3

[56] References Cited

U.S. PATENT DOCUMENTS

| | | | |
|---|---|---|---|
| 4,665,506 | 5/1987 | Cline et al. | 365/189.01 |
| 4,899,275 | 2/1990 | Sachs et al. | 395/403 |
| 4,977,498 | 12/1990 | Rastegar et al. | 364/200 |
| 5,025,366 | 6/1991 | Baror | 364/200 |
| 5,091,846 | 2/1992 | Sachs et al. | 395/250 |
| 5,218,686 | 6/1993 | Thayer | 395/425 |
| 5,230,070 | 7/1993 | Liu | 395/425 |
| 5,247,648 | 9/1993 | Watkins et al. | 395/425 |
| 5,255,384 | 10/1993 | Sachs et al. | 395/425 |
| 5,325,504 | 6/1994 | Tipley et al. | 395/425 |
| 5,353,428 | 10/1994 | Shibata | 395/425 |
| 5,371,872 | 12/1994 | Larsen et al. | 395/425 |
| 5,381,538 | 1/1995 | Animi et al. | 395/425 |
| 5,392,391 | 2/1995 | Caulk, Jr. et al. | 395/162 |
| 5,404,489 | 4/1995 | Woods et al. | 395/425 |
| 5,469,555 | 11/1995 | Ghosh et al. | 395/460 |

OTHER PUBLICATIONS

Motorola, Section 7, "Instruction and Data Caches," MC68040 32-Bit Microprocessor User's Manual (1989).

*Primary Examiner*—Thomas C. Lee
*Assistant Examiner*—Anderson I. Chen
*Attorney, Agent, or Firm*—Finnegan, Henderson, Farabow, Garrett & Dunner, L.L.P.

[57] ABSTRACT

A computer system for controlling the mode of operation of a data cache. When a DMA state machine detects a DMA cycle to a memory block, the machine interrupts the processor so the processor sets a new value of the DMA state to control the mode of cache operation associated with the block.

17 Claims, 4 Drawing Sheets

SYSTEM FOR CONTROLLING MODE OF OPERATION OF A DATA CACHE BASED ON STORING THE DMA STATE OF BLOCKS BY SETTING THE DMA STATE TO STALL

BACKGROUND OF THE INVENTION

The present invention relates to data caching by computers. More particularly, the present invention relates to a computer system and method for controlling the mode of operation of a data cache to ensure data integrity.

Advanced computer systems usually include large data caches in addition to instruction caches. Data caches can dramatically improve system performance by providing cached data to execution units with very low latency and by increasing the availability of the system bus for use by external devices. Such external devices may include direct memory access (DMA) agents that provide direct access to data stored in the system's memory. Examples of DMA agents include various storage devices, input/output (I/O) ports, communication devices, as well as other types of separate processors in a shared-bus system. DMA cycles performed by DMA agents include read cycles, wherein data is read directly from the memory, and write cycles, wherein data is written directly to the memory.

Systems which use data caches and support DMA cycles need some mechanism to ensure integrity between cached data and data stored in the memory. Most conventional solutions to this problem involve data snooping, a well know technique to maintain data integrity by monitoring DMA cycles and performing cache maintenance operations in response to LAW specific DMA operations. For example, in response to a DMA to a particular line of memory, matching cache lines can be invalidated during the DMA access or the memory portion can be inhibited to allow the processor to respond to the access as a slave. By intervening in the access, the processor can update its internal cache for a DMA write cycle or supply cache data to the DMA agent for a DMA read cycle.

Data integrity may also be supported by switching the mode of the cache between writethrough, copyback, and cache-inhibited (noncacheable) modes for specific memory segments. In writethrough mode, writes by the processor to locations in the cache change the target location of the main memory as well as the cache memory. In copyback mode, writes by the processor to locations in the cache only change the cache memory, not the main memory. In cache-inhibited mode, the cache is deactivated so that no cache reads or writes occur. Typically, the modes of cache operation associated with specific memory segments are stored as tags within a memory management unit (MMU) associated with the processor.

For example, using data snooping, a memory segment shared by the processor and DMA agents can be designated in copyback mode, allowing both the processor and the DMA agents to cache the data. Because all cache writes will be written to the target address of the memory, the snooping mechanism will ensure the integrity of the other cached copies of the data.

The MC68040 microprocessor manufactured by Motorola Inc. of Phoenix, Ariz. supports snooping and cache mode switching. That microprocessor's cache coherency mechanism as well as its data cache operation modes and the storage tags are further described in Section 7 of the MC68040 32-Bit Microprocessor User's Manual (1989), which is incorporated herein by reference.

While some systems may employ data snooping techniques to ensure data integrity, others systems include DMA agents which cannot efficiently support or are incompatible with the data snooping mechanism of other components. For example, certain types of DRAM controllers do not support snooping for a MC68040 microprocessor. Moreover, without the use of snooping, cache mode switching alone cannot ensure data integrity, except in those systems where the memory management system knows the locations accessible to every DMA agent prior to run time.

Thus, systems incapable of data snooping, and for which all memory locations accessible to DMA agents are not known in advance, cannot use data caches. As a result, the system's performance suffers. Accordingly, there remains a need for a computer system and method for controlling the mode of operation of a data cache to ensure data integrity which does not rely on data snooping and does not require prior knowledge of memory locations accessible by the DMA agents.

SUMMARY OF THE INVENTION

Accordingly, the present invention is directed to a computer system and method for controlling the mode of operation of a data cache that substantially obviates one or more of the problems due to limitations and disadvantages of the prior art.

It is an object of the present invention to provide a computer system and method for efficiently controlling the mode of operation of a data cache in a multiprocessor system.

It is a further object of the present invention to provide a computer system and method for efficiently controlling the mode of operation of a data cache in a multiprocessor system wherein sections of memory are used as DMA read and write buffers for communicating between processors.

It is another object of the present invention to provide a computer system and method for efficiently controlling the mode of operation of a data cache in a multiprocessor system by locating DMA read and write buffers during system operation.

It is a still further object of the present invention to provide a computer system and method for efficiently controlling the mode of operation of a data cache which adaptively optimizes the cache mode for the system in real time as DMA cycles occur.

It is a still further object of the present invention to provide a computer system and method for efficiently controlling the mode of operation of a data cache wherein the cache control mechanism is transparent to external DMA agents and requires no knowledge of system characteristics.

Additional objects and advantages of the invention will be set forth in part in the description which follows, and in part will be obvious from the description, or may be learned by practice of the invention. The objects and advantages of the invention will be realized and attained by means of the elements, method steps, and combinations particularly pointed out in the appended claims.

To achieve the objects and in accordance with the purpose of the invention, as embodied and broadly described herein, the invention comprises a method for controlling a mode of operation of a data cache in a computer system having a processor, a data cache, a DMA agent, and first and second memories. The first memory is partitioned into a plurality of blocks. The method includes the steps of storing a DMA state associated with each of the blocks in the second memory and detecting a DMA cycle to one of the blocks by the DMA agent. The method further includes the steps of setting a value of the DMA state associated with the block based on the detected DMA cycle and the current value of the DMA state associated with the one block and controlling the mode of operation of the data cache for the block based on the block's associated DMA state.

Furthermore, as embodied and broadly described herein, the invention comprises a computer system for controlling the mode of operation of a data cache. The computer system includes a processor with an associated data cache. The system further includes a DMA agent and first and second memories connected to the processor. The first memory is partitioned into a plurality of blocks. The second memory stores a DMA state associated with each of the blocks. The system further includes a DMA state machine connected to the DMA agent and the processor having means for detecting a DMA cycle to one of the blocks and interrupting the processor in response to the detected DMA cycle and a current value of the DMA state associated with the block. In addition, the processor includes means for setting a value of the DMA state associated with the block based on the detected DMA cycle and the current value of the DMA state associated with the block, and means for controlling the mode of operation of the data cache for the block based on the associated DMA state.

Both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
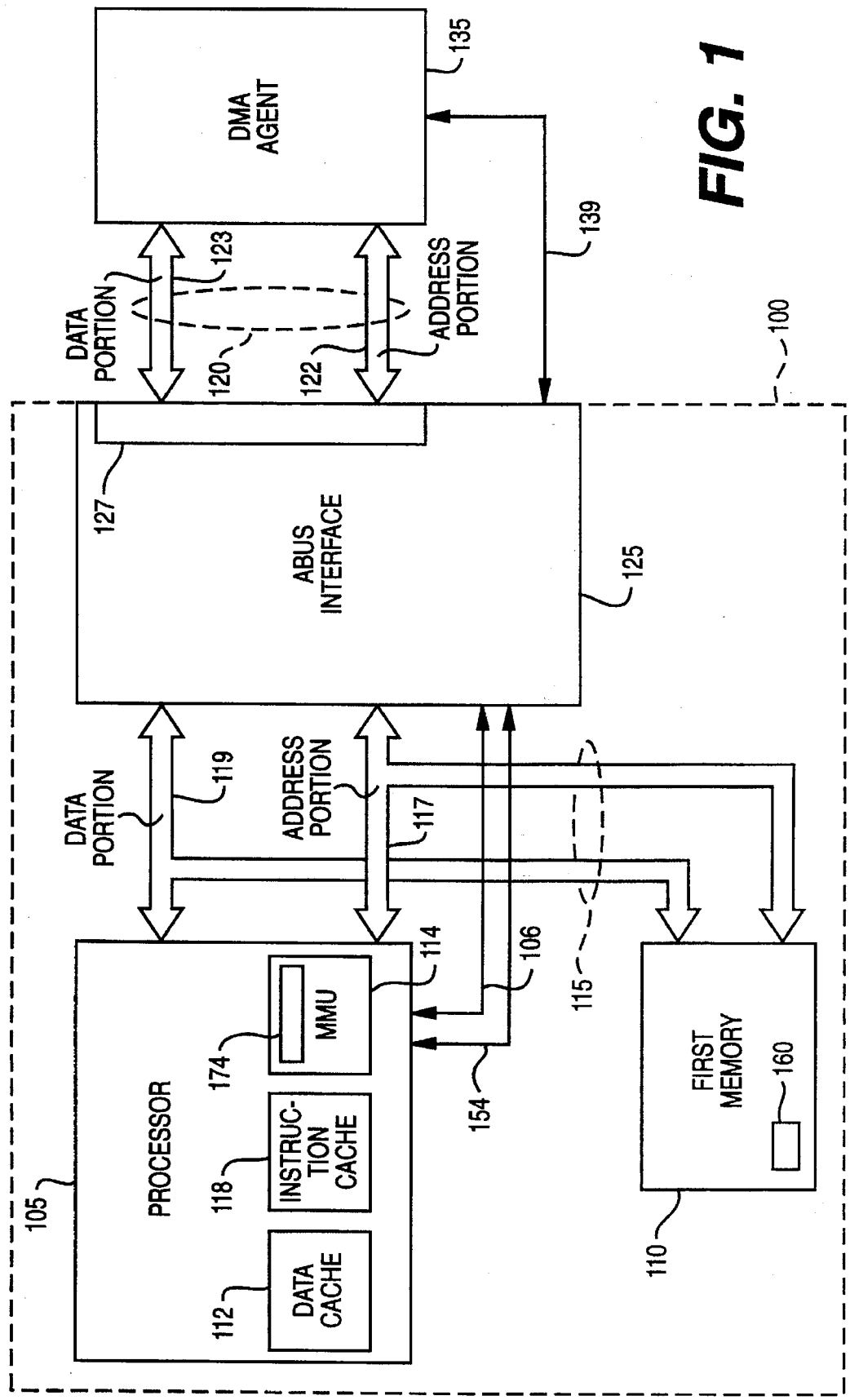
FIG. 1 is a block diagram illustrating the computer system of the present invention.

The computer system of the present invention is shown in FIG. 1 and is designated generally by reference numeral 100. The computer system 100 comprises a processor 105, a data cache 112 and an instruction cache 118 associated with processor 105, and a first memory 110 connected to processor 105. The computer system further comprises an ABUS interface 125 connected to a DMA agent 135 and processor 105. Many of the details of computer system 100 are well known in art and are not specifically pertinent to the present invention. Therefore, some such details have been omitted for purposes of clarity.

As embodied herein and referring to FIG. 1, processor 105 is a commercially available microprocessor such as the MC68040 microprocessor manufactured by Motorola Inc. of Phoenix, Ariz., and is able to respond to external interrupt sources. Computer system 100 further includes a first memory 110 connected to first bus 115. First memory 110 is partitioned into a plurality of blocks 160. First memory 110 may comprise a single memory element, a combination of memory elements in different locations, or any subset thereof, depending on system requirements. In the preferred embodiment of the invention, first memory 110 comprises a 4 megabyte memory partitioned into 1024 4-kilobyte blocks 160.

Computer system 100 of the present invention further includes a first bus 115 connected to processor 105. First bus 115 includes an address portion 117 and a data portion 119, and is preferably based on the Motorola 68030 bus. The Motorola 68030 bus architecture is further described in the Motorola 68030 User's Manual (2d Ed. 1989), which is incorporated herein by reference.

Computer system 100 further includes a data cache 112 and a memory management unit (MMU) 114 associated with processor 105. MMU 114 includes a tag system 174 which stores the mode of cache operation associated with blocks 160. Data cache 112, instruction cache 118, MMU 114, and tag system 174 are preferably internal components supplied in the MC68040 microprocessor.

Preferably, processor 105, MMU 114, tag system 174, and data cache 112 are configured to allow at least three modes of data cache operation: writethrough mode, copyback mode, and cache-inhibited (noncachable) mode. Each cache mode can be enabled by MMU 114 in accordance with the stored mode of cache operation of tag system 174.

Figure 3A:
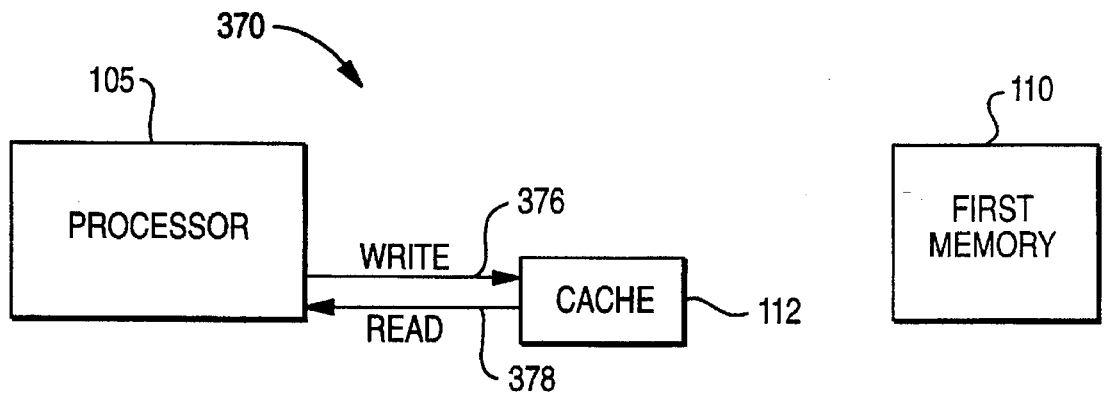
FIG. 3(a) is a block diagram illustrating operation of the data cache in copyback mode.

Referring to FIG. 3(a), in copyback mode 370, processor 105 writes data which "hits" (i.e., is directed to a location represented in cache) only to data cache 112, as illustrated by write arrow 376, not to first memory 110. Likewise, processor 105 only reads data which "hits" from data cache 112, as illustrated by read arrow 378, not from first memory 110. Reads and writes which are not hits require the target locations to be read into memory. Use of copyback mode minimizes external bus usage and reduces latency of write accesses by the processor, thus increasing system performance. DMA cycles that can only access first memory 110, however, can jeopardize data integrity and thus are not allowed.

Figure 3B:
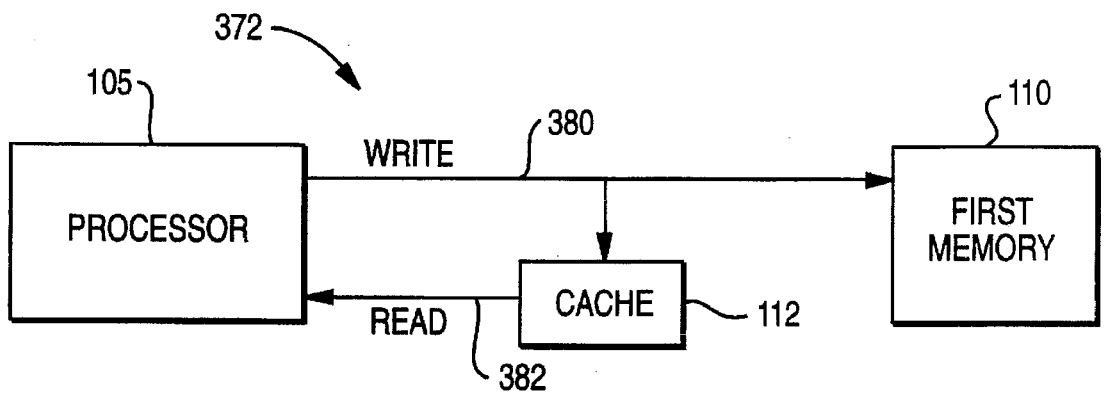
FIG. 3(b) is a block diagram illustrating operation of the data cache in writethrough mode.

Referring to FIG. 3(b), in writethrough mode 372, processor 105 writes data which hits to the target address of first memory 110, as well as data cache 112, as illustrated by write arrow 380. However, processor 105 only reads data which hits from data cache 112, as illustrated by read arrow 382, not from first memory 110. Writethrough mode provides better system performance than cache-inhibited mode, but again, DMA write cycles can jeopardize data integrity and thus are not allowed.

Figure 3C:
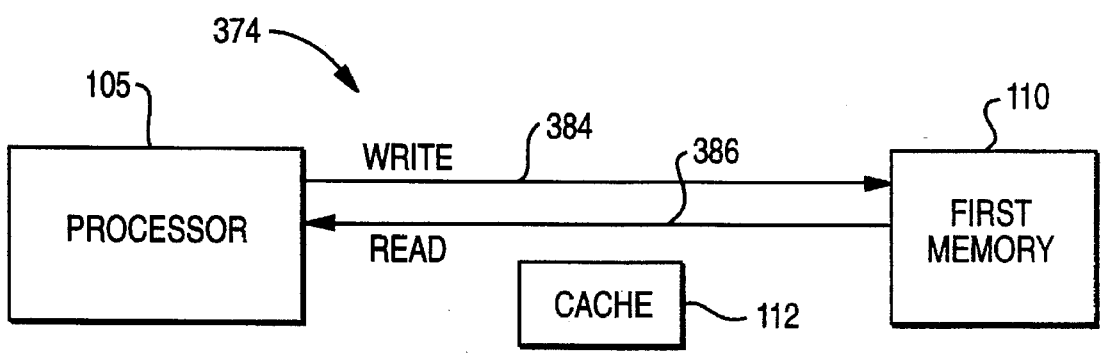
FIG. 3(c) is a block diagram illustrating operation of the data cache in cache-inhibited mode.

Referring to FIG. 3(c), in cache-inhibited mode 374, data cache 112 is deactivated so that no cache reads or writes occur. Accordingly, processor 105 reads and writes all data to the target address of first memory 110 as illustrated by write arrow 384 and read arrow 386. Since there is no problem with data integrity, all DMA cycles are allowed. System performance, however, is relatively low.

A more detailed description of the MC68040 microprocessor, its internal caches, MMU, and tag system, as well as its modes of data cache operation appears in the MC68040 32-Bit Microprocessor User's Manual (1989), which is incorporated herein by reference.

Computer system 100 of the present invention further includes an ABUS interface 125 coupled to first bus 115. Processor 105 is also coupled to ABUS interface 125 via a connections 106 and 154. ABUS interface 125 has a back connector 127 for connecting ABUS interface 125 to a second bus 120. Second bus 120 includes an address portion 122 and a data portion 123. Second bus 120 is connected to at least one DMA agent 135, which can include any type of well know storage device, I/O port, communication device, DRAM controller, or any other type of separate processor. In the preferred embodiment of the invention, second bus 120 is connected to numerous DMA agents. Because the system operation is essentially the same with one or many devices, this description references a single DMA agent 135, which is also coupled to ABUS state machine 125 via a connection 139.

DMA agent 135 is any device in the arbitration chain which can gain access to first bus 115 and read or write data to at least a portion of first memory 110. DMA cycles performed by DMA agent 135 may include read cycles, wherein data is read from first memory 110, and write cycles, wherein data is written to first memory 110.

Second bus 120 is preferably an asynchronous bus based on the older Motorola 68000 bus to allow compatibility with certain existing external devices 135. Depending on the specific application of the present invention, however, other well known bus standards may be more appropriate. The Motorola 68000 bus architecture is further described in the Motorola 68000 User's Manual (7th Ed. 1989), which is incorporated herein by reference.

Figure 2:
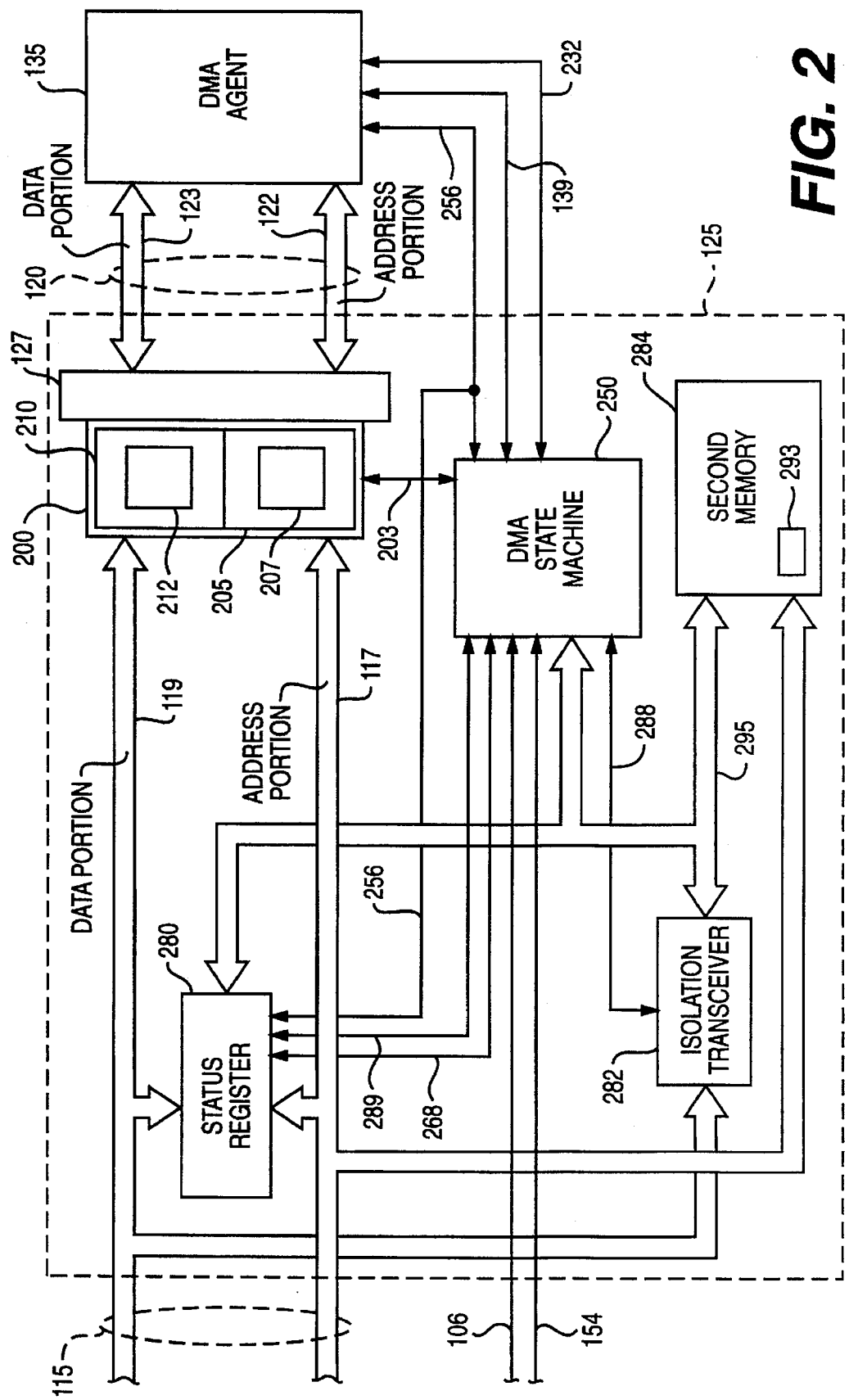
FIG. 2 is a block diagram illustrating the ABUS interface of the computer system of FIG. 1.

ABUS interface 125 provides capability for processor 105 to communicate with external devices 135 connected to second bus 120. FIG. 2 is a block diagram illustrating ABUS interface 125. ABUS interface 125 is further described in U.S. patent application of Jay D. Jeter and Ronald J. Landry, entitled "Computer System and Method for Diagnosing and Isolating Faults," filed on the same date herewith, and which is incorporated herein by reference.

As shown in FIG. 2, first bus 115 extends into and makes connections within ABUS interface 125. ABUS interface 125 includes a transceiver circuit 200 connected to first bus 115. Transceiver circuit 200 includes an address transceiver 205 connected to address portion 117 and a data transceiver 210 connected to data portion 119. Address transceiver 205 and data transceiver 210 include registers 207 and 212, respectively. Registers 207 and 212 each preferably include tri-state D-type flip-flops (not shown). Address transceiver 205 and data transceiver 210 each preferably include control circuitry arranged for multiplexed transmission of data directly from first bus 115, second bus 120, or registers 207 and 212. For example, address transceiver 205 and data transceiver 210 comprise a plurality of octal transceivers such as 74F646 transceivers, as are known in the art and commercially available from the National Semiconductor Company. Data transceiver 210 preferably comprises four 74F646 transceivers. Likewise, address transceiver 205 preferably comprises three 74F646 transceivers.

Address transceiver 205 and data transceiver 210 are connected to address portion 122 and data portion 123 of second bus 120, respectively, via back connector 127. Transceiver circuit 200 isolates first bus 115 and second bus 120 so that processor 105 can respond to interrupts during a DMA cycle by external device 135.

ABUS interface 125 further comprises a data bus 295, a status register 280, a second memory 284, and an isolation transceiver 282 coupled to data bus 295. Data bus 295 is preferably based on the Motorola 68030 bus architecture. Isolation transceiver 282 couples data portion 119 of first bus 115 to data bus 295, and preferably includes control circuitry arranged for multiplexed transmission of data directly from data portion 119 or data bus 295. For example, isolation transceiver 282 comprises four octal transceivers such as 74ACTQ245 transceivers, as are known in the art and commercially available from the National Semiconductor Company. During DMA cycles by DMA agent 135, isolation transceiver 282 is disabled by DMA state machine 250 via a connection 288, thus isolating data bus 295 such that DMA state machine 250 can read second memory 284.

Second memory 284 may comprise a single memory element or a combination of memory elements in different locations, depending on system requirements. In the preferred embodiment of the invention, second memory 284 comprises a 4K by 4-bit single port RAM, with 2 bits being unused. Alternatively, a 4K by 2-bit RAM could be used. Second memory 284 stores a DMA state 293 associated with each of the blocks 160 of first memory 110.

Status register 280 is a memory element coupled to data portion 119 and address portion 117 of first bus 115 and data bus 295. Status register 280 is also connected to DMA agent 135 via a connection 256 for receiving read/write information. Status register 280 may comprise a single memory element, a combination of memory elements in different locations, or any subset thereof, depending on system requirements. In the preferred embodiment of the invention, status register 280 comprises two 74ACT574 octal D-type flip-flops (not shown), commercially available from the National Semiconductor Company. Status register 280 is also connected to DMA state machine 250 via a connection 268.

In operation, for a DMA cycle by a DMA agent 135 to an address in a block 160, status register 280 latches the address via address portion 117 of first bus 115. At the same time, status register 280 latches the DMA read/write information via connection 256 and the DMA state associated with the block 160 via data bus 295. Status register 280 is controlled by DMA state machine 250 via connection 268 and provides the latched information to processor 105 via data portion 119 of first bus 115.

In the preferred embodiment of the invention, status register 280 also latches a stall bit via a connection 289 to DMA state machine 250. The stall bit indicates whether the DMA state associated with the block 160 is a "stall state," as described below. Although this same information is included in the latched DMA state, providing a single bit allows processor 105 to begin executing the "stall state" before decoding the 2-bit DMA state, thus improving system performance.

ABUS interface 125 further comprises a DMA state machine 250 as well as an ABUS access state machine, an arbitration state machine, and a diagnostic state machine (not shown). DMA state machine 250 is connected to transceiver circuit 200 via a connection 203 for controlling transceiver circuit 200. DMA state machine 250 has a connection 139 via an arbitration state machine (not shown) to DMA agent 135 for detecting DMA cycles of DMA agent 135 and for arbitrating second bus 120; connection 256 for receiving read/write information from DMA agent 135; connection 106 via an arbitration state machine (not shown) to processor 105 for requesting first bus 115; and connection 154 to processor 105 for interrupting processor 105.

DMA state machine 250 is also coupled to second memory 284 via data bus 295 for receiving DMA states 293 supplied from second memory 284. DMA state machine 250 arbitrates for first bus 115 when DMA agent 135 requests the bus via connection 139 for a DMA cycle to a block 160. When it gets access to first bus 115, DMA state machine 250 utilizes DMA state 293 associated with the block 160 to generate interrupts to processor 105 and stall the DMA cycle of DMA agent 135 as described below. As is well known in the art, DMA state machine 250 is comprised of standard logic and memory elements configured to perform the functions describe herein.

In operation of computer system 100, processor 105 stores a DMA state 293 associated with each of the blocks 160 of first memory 110. DMA states 293 are stored in second memory 284, with two bits of second memory 284 being associated with each block 160. In storing or modifying DMA states 293, isolation transceiver 282 is enabled to allow processor 105 to perform write cycles using first bus 115 to access second memory 284 via data bus 295. Additionally, processor 105, in conjunction with MMU 114, stores a mode of cache operation associated with each block 160 using tag system 174. The initial mode of cache operation for each block 160 is copyback mode. Processor 105, in conjunction with MMU 114, uses the stored modes of cache operation to control the operational mode of data cache 112 for the associated block 160. Moreover, DMA state machine 250 utilizes stored DMA states 293 associated with the blocks 160 to generate interrupts to processor 105 and stall the DMA cycles of DMA agent 135.

A DMA state 293 is a state representing system knowledge of whether particular DMA cycles are allowable to the associated block 160. In the preferred embodiment, four different DMA states 293 are allowable: no protection state (state 0), write protect state (state 1), write interrupt state (state 2), and stall state (state 3). These DMA states 293 are stored in second memory 284 as shown in table 1:

TABLE 1

| State | First Bit | Second Bit |
|---|---|---|
| No protection | 0 | 0 |
| Write protect | 0 | 1 |
| Interrupt | 1 | 0 |
| Stall | 1 | 1 |

Because blocks 160 of first memory 110 accessible to DMA agent 135 are not known in advance, processor 105 initially stores a "stall" state for each block 160. Alternatively, if some blocks 160 are known in advance to be nonaccessible to DMA cycles, such as blocks containing software code, processor 105 stores a "write protect" state for these blocks.

Figure 4:
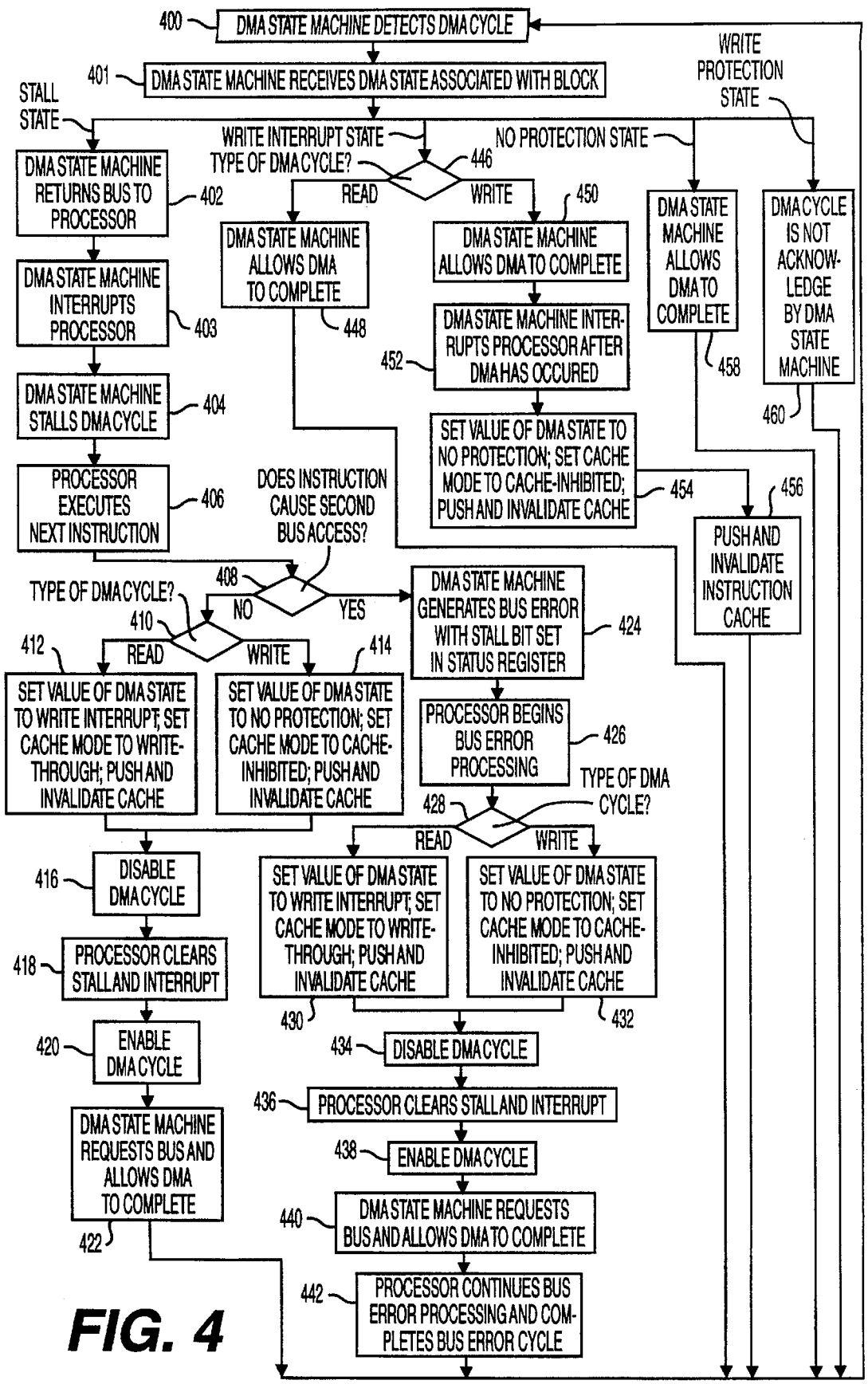
FIG. 4 is a flowchart illustrating the preferred method of the present invention.

A flowchart illustrating the preferred method of the invention is shown in FIG. 4. In responding to a DMA by a DMA agent 135 to a block 160, the DMA state machine 250 detects the DMA cycle through connection 139 to DMA agent 135 via an arbitration state machine (step 400), and receives a DMA state associated with the block through data bus 295 to second memory 284 (step 401).

For a "stall" state, DMA state machine 250 stalls any detected DMA cycle by DMA agent 135. Although DMA agent 135 believes the DMA cycle is continuing, DMA state machine 250 returns first bus 115 to processor 105 (step 402), interrupts processor 105 through connection 154 (step 403), and stalls the DMA cycle by controlling transceiver circuit 200 via connection 203 (step 404).

Processor 105 then executes its next instruction (step 406). If execution of the instruction does not cause processor 105 to access second bus 120, steps 410 to 422 are executed; otherwise steps 424 to 442 are executed. (step 408).

If steps 410 to 422 are executed, processor 105 sets a mode of cache operation and a value of the DMA state 293 associated with the block 160 based on the DMA cycle. If the DMA cycle is a DMA read cycle, processor 105 sets the mode of cache operation to writethrough, sets the value of DMA state 293 associated with the block 160 to a "write interrupt" state, an pushes and invalidates data cache 112 in conjunction with MMU 114. (steps 410 and 412). If the DMA cycle is a DMA write cycle, the processor 105 sets the mode of cache operation to cache-inhibited, sets the value of DMA state 293 associated with the block 160 to "no protection" state, and pushes and invalidates data cache 112 in conjunction with MMU 114. (steps 410 and 414). The DMA state machine 250 then disables the DMA cycle via connection 203 (step 416) and processor 105 clears the stall and interrupt (step 418). DMA state machine 250 then enables the DMA cycle (step 420) and requests bus access via connection 106, allowing the DMA cycle to complete (step 422).

If steps 410 to 422 are executed, DMA state machine 250 generates a bus error with a stall bit set in status register 280 (step 424) and the processor begins bus error processing (step 426). Processor 105 then sets a mode of cache operation and a value of the DMA state 293 associated with the block 160 based on the DMA cycle. If the DMA cycle is a DMA read cycle, processor 105 sets the mode of cache operation to writethrough, sets the value of DMA state 293 associated with the block 160 to a "write interrupt" state, an pushes and invalidates data cache 112 in conjunction with MMU 114. (steps 428 and 430). If the DMA cycle is a DMA write cycle, the processor 105 sets the mode of cache operation to cache-inhibited, sets the value of DMA state 293 associated with the block 160 to "no protection" state, and pushes and invalidates data cache 112 in conjunction with MMU 114. (steps 428 and 432). The DMA state machine 250 then disables the DMA cycle via connection 203 (step 434) and processor 105 clears the stall and interrupt (step 436). DMA state machine 250 then enables the DMA cycle (step 438) and requests bus access via connection 106, allowing the DMA cycle to complete (step 440). After the DMA cycle completes, process 105 continues bus error processing and completes the error cycle. (step 442).

In the "write interrupt" state, DMA state machine 250 allows a detected DMA read cycle by DMA agent 135 to complete normally and no interrupt is given (steps 446 and 448). Where the detected DMA cycle is a write cycle, DMA state machine 250 allows the DMA write to complete (step 450) and then interrupts processor 105 via connection 154 after the DMA write has occurred (step 452). Processor 105 then sets the mode of cache operation to cache-inhibited, sets the value of DMA state 293 associated with the block 160 to "no protection" state, and pushes and invalidates data cache 112 in conjunction with MMU 114. (step 454). Processor 105 then pushes and invalidates instruction cache 118 in conjunction with MMU 114. (step 456).

In the "no protection" state, DMA cycles by DMA agent 135 detected by DMA state machine 250 are allowed to proceed normally without interrupting processor 105. (step 458).

In the "write protect" state, detected DMA cycles by DMA agent 135 are not acknowledged by DMA state machine 250 and do not proceed (step 460). Moreover, DMA state machine 250 sends no interrupt to processor 105.

DMA cycles to blocks 160 in this state will generate DMA bus errors. The purpose of this state is to protect the software code from corruption.

In implement the foregoing, it is important to note that the processor interrupt routine as described above must execute in less time that the bus error timer of the DMA agent. Moreover, the present invention is especially useful for controlling the mode of operation of a data cache in a multiprocessor system wherein sections of main memory are used as static DMA read and write buffers for communicating between processors. Examples of such systems include conventional and cellular telephony switching systems.

It will be apparent to those skilled in the art that various modifications and variations can be made in the computer system and method of the present invention without departing from the scope or spirit of the invention. Moreover, other embodiments of the invention will be apparent to those skilled in the art from consideration of the specification and practice of the disclosed invention herein. The specification and examples are thus only exemplary, with the true scope and spirit of the invention being indicated by the following claims.

What is claimed is:

1. In a computer system comprising a processor, a data cache, a DMA agent, a first memory partitioned into a plurality of blocks, and a second memory, a method for controlling a mode of operation of said data cache, comprising the steps, executed by the computer system, of:

storing a DMA state associated with each of said plurality of blocks in said second memory by setting said DMA states to a stall state;

detecting a DMA cycle to one block of said plurality of blocks by said DMA agent;

setting a value of said DMA state associated with said one block based on the detected DMA cycle and a current value of said DMA state associated with said one block; and controlling said mode of operation of said data cache for said one block based on the value of the DMA state associated with said one block.

2. In a computer system comprising a processor, a data cache, a DMA agent, a first memory partitioned into a plurality of blocks, and a second memory, a method for controlling a mode of operation of said data cache, comprising the steps, executed by the computer system, of:

storing a DMA state associated with each of said plurality of blocks in said second memory by setting said DMA state to a stall state;

detecting a DMA cycle to one block of said plurality of blocks by said DMA agent;

setting a value of said DMA state associated with said one block based on the detected DMA cycle and a current value of said DMA state associated with said one block by setting said DMA state associated with said one block to a write interrupt state when said detected DMA cycle is a DMA read cycle and said current value of said DMA state associated with said one block is a stall state; and controlling said mode of operation of said data cache for said one block based on the value of the DMA state associated with said one block.

3. The method of claim 2, wherein the step of setting a value of said DMA state further includes the substep of:

setting said DMA state associated with said one block to a no protection state if said detected DMA cycle is a DMA write cycle and said current value of said DMA state associated with said one block is a stall state.

4. The method of claim 3, wherein the step of setting a value of said DMA state further includes the substep of:

setting said DMA state associated with said one block to a no protection state if said detected DMA cycle is a DMA write cycle and said current value of said DMA state associated with said one block is a write interrupt state.

5. The method of claim 4, wherein the step of controlling said mode of operation of said data cache includes the substep of:

operating said data cache in a cache-inhibited mode if the value of the DMA state associated with said one block is said no protection state.

6. The method of claim 5, wherein the step of controlling said mode of operation of said data cache further includes the substep of:

operating said data cache in a writethrough mode if said the value of the DMA state associated with said one block is said write interrupt state.

7. The method of claim 6, wherein the step of controlling said mode of operation of said data cache further includes the substep of:

operating said data cache in a copy back mode if said the value of the DMA state associated with said one block is said stall state.

8. The method of claim 2, wherein the step of storing a DMA state associated with each of said plurality of blocks includes the substep of:

setting a first portion of said DMA states to a stall state and a second portion of said DMA states to a write protect state.

9. In a computer system comprising a processor, a data cache, a DMA agent, a first memory partitioned into a plurality of blocks, and a second memory, each of said blocks having a mode of cache operation associated therewith stored in a tag system, comprising the steps, executed by the computer system, of:

storing a DMA state associated with each of said plurality of blocks in said second memory by setting said DMA states to a stall state;

detecting a DMA cycle to one block of said plurality of blocks by said DMA agent;

setting a value of said DMA state and a value of said mode of operation associated with said one block based on the detected DMA cycle and a current value of said DMA state associated with said one block; and controlling said mode of operation of said data cache for said one block based on the value of the mode of operation associated with said one block.

10. In a computer system comprising a processor, a data cache, a DMA agent, a first memory partitioned into a plurality of blocks, and a second memory, each of said blocks having a mode of cache operation associated therewith stored in a tag system, comprising the steps, executed by the computer system, of:

storing a DMA state associated with each of said plurality of blocks in said second memory by setting said DMA states to a stall state;

detecting a DMA cycle to one block of said plurality of blocks by said DMA agent;

setting a value of said DMA state and a value of said mode of operation associated with said one block based on the detected DMA cycle and a current value of said DMA state associated with said one block by setting said DMA state associated with said one block to a write interrupt state and setting said mode of cache operation associated with said one block to a writethrough mode when said detected DMA cycle is a DMA read cycle and said current value of said DMA state associated with said one block is a stall state; and controlling said mode of operation of said data cache for said one block based on the value of the mode of operation associated with said one block.

11. The method of claim 10, wherein the step of setting a value of said DMA state and a value of said mode of operation further includes the substep of:

setting said DMA state associated with said one block to a no protection state and setting said mode of cache operation associated with said one block to a cache-inhibited mode if said detected DMA cycle is a DMA write cycle and said current value of said DMA state associated with said one block is a stall state.

12. The method of claim 11, wherein the step of setting a value of said DMA state and a value of said mode of operation further includes the substep of:

setting said DMA state associated with said one block to a no protection state and setting said mode of cache operation associated with said one block to a cache-inhibited mode if said detected DMA cycle is a DMA write cycle and said current value of said DMA state associated with said one block is a write interrupt state.

13. The method of claim 12, wherein the step of storing a DMA state associated with each of said plurality of blocks includes the substep of:

setting said a first portion of said DMA states to a stall state and a second portion of said DMA states to a write protect state.

14. The method of claim 10, wherein the step of storing a DMA state associated with each of said plurality of blocks includes the substep of:

setting said a first portion of said DMA states to a stall state and a second portion of said DMA states to a write protect state.

15. A computer system for controlling the mode of operation of a data cache, comprising:

a processor;

a data cache associated with said processor;

a DMA agent connected to said processor;

a memory including:
a first memory partitioned into a plurality of blocks, and
a second memory for storing a DMA state associated with each of said plurality of blocks, said memory connected to said processor; and a DMA state machine connected to said DMA agent and said processor, said DMA state machine including:
means for detecting a DMA cycle to one block of said plurality of blocks by said DMA agent and for interrupting said processor in response to said detected DMA cycle and a current value of said DMA state associated with said one block; wherein said processor includes:
means for setting a value of said DMA state associated with said one block based on the detected DMA cycle and a current value of said DMA state associated with said one block, and
means controlling said mode of operation of said data cache for said one block based on the value of the DMA state associated with said one block.

16. A computer system for controlling the mode of operation of a data cache, comprising:

a processor;

a data cache associated with said processor;

a DMA agent connected to said processor;

a first memory partitioned into a plurality of blocks and connected to said processor;

a second memory for storing a DMA state associated with each of said blocks, said second memory being connected to said processor;

means for storing a mode of cache operation associated with each of said blocks; and a DMA state machine connected to said DMA agent and said processor, said DMA state machine including
means for detecting a DMA cycle to one block of said plurality of blocks by said DMA agent and for interrupting said processor in response to said detected DMA cycle and a current value of said DMA state associated with said one block; wherein said processor includes
means for setting a value of said DMA state and a value of said mode of operation associated with said one block based on the detected DMA cycle and a current value of said DMA state associated with said one block;

and means for controlling said mode of operation of said data cache for said one block based on the value of the mode of operation associated with said one block.

17. A computer system for controlling the mode of operation of a data cache, comprising:

a processor;

a first bus connected to the processor, said first bus;

a first memory connected to said first bus, said first memory being partitioned into a plurality of blocks;

a second memory for storing a DMA state associated with each of said blocks;

an isolation transceiver connecting said second memory to said processor;

a second bus;

a transceiver connecting said first bus to said second bus;

a data cache associated with said processor;

a MMU associated with the processor, said MMU having a tag system for storing a mode of cache operation for each of said blocks and means for controlling said cache operation in writethrough mode, copyback mode, and cache-inhibited modes; and a DMA state machine connected to said DMA agent, said transceiver, said second memory, and said processor and including means for detecting a DMA cycle to one of said plurality of blocks by said DMA agent and interrupting said processor in response to said detected DMA cycle and a current value of said DMA state associated with said one block; wherein said processor includes means for setting a value of said DMA state and said mode of operation associated with said one block based on the detected DMA cycle and a current value of said DMA state associated with said one block, and means for controlling said mode of operation of said data cache for said one block based on the value of the mode of operation associated with said one block.

* * * * *